United States Patent [19]

Strom

[11] 4,438,506
[45] Mar. 20, 1984

[54] MESSAGE WAITING LIGHT CONTROL SYSTEM

[75] Inventor: Alan R. Strom, Roeland Park, Kans.

[73] Assignee: H & K Computer Corporation, Kansas City, Mo.

[21] Appl. No.: 290,375

[22] Filed: Aug. 4, 1981

[51] Int. Cl.³ .......................... G06F 15/20; H04M 1/00
[52] U.S. Cl. .................................... 364/900; 179/84 C
[58] Field of Search ...................... 364/200, 900; 179/18 BG, 27 FC, 84 C, 84 L, 99 LS; 340/825.17, 815.01, 815.11, 815.12

[56] References Cited

U.S. PATENT DOCUMENTS

| | | | |
|---|---|---|---|
| 3,743,792 | 7/1973 | Duff et al. | 179/99 LS X |
| 4,072,825 | 2/1978 | McLay et al. | 179/84 C X |
| 4,086,441 | 4/1978 | Ullakko et al. | 179/84 C |
| 4,140,882 | 2/1979 | Regan et al. | 179/84 C X |
| 4,280,021 | 7/1981 | Yuan | 179/84 C |

*Primary Examiner*—Thomas M. Heckler
*Attorney, Agent, or Firm*—Litman, Day & McMahon

[57] ABSTRACT

A message waiting light control system for use in cooperation with a message storage and retrieval computer includes a microprocessor, a memory, address decoders, and an organization of message waiting lights, relays, and latches. The lights, relays and latches are organized in subgroups as memory mapped input/output words which correspond to the words of bits in the memory. Groups of the latches and relays are addressable. The microprocessor is responsive to an identification code number and a message waiting command to address the proper group and to write a data word to the proper subgroup to activate the selected light. In a similar manner, the lights may be deactivated.

10 Claims, 5 Drawing Figures

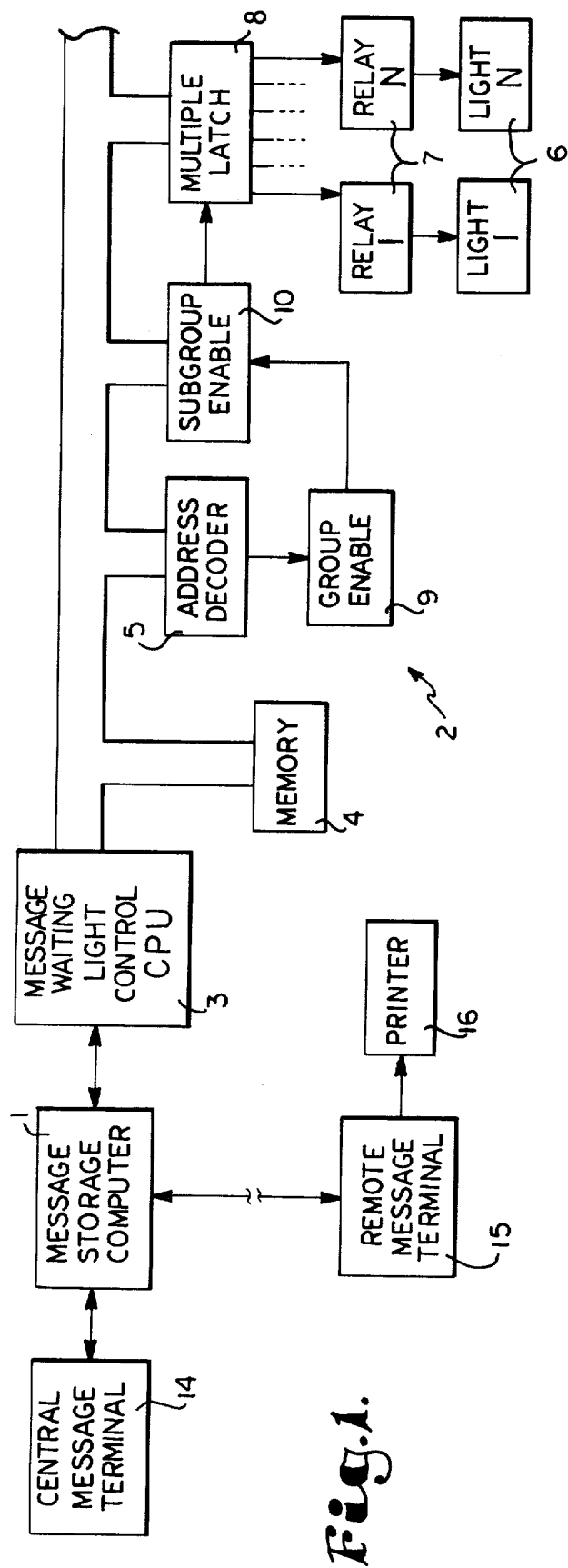
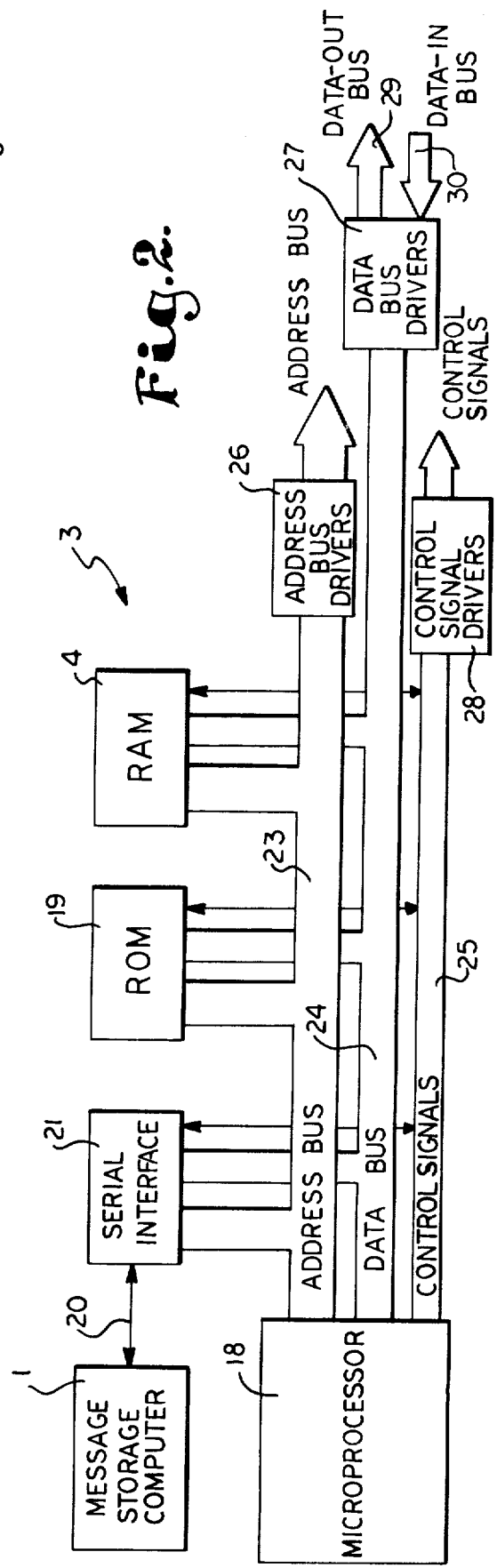

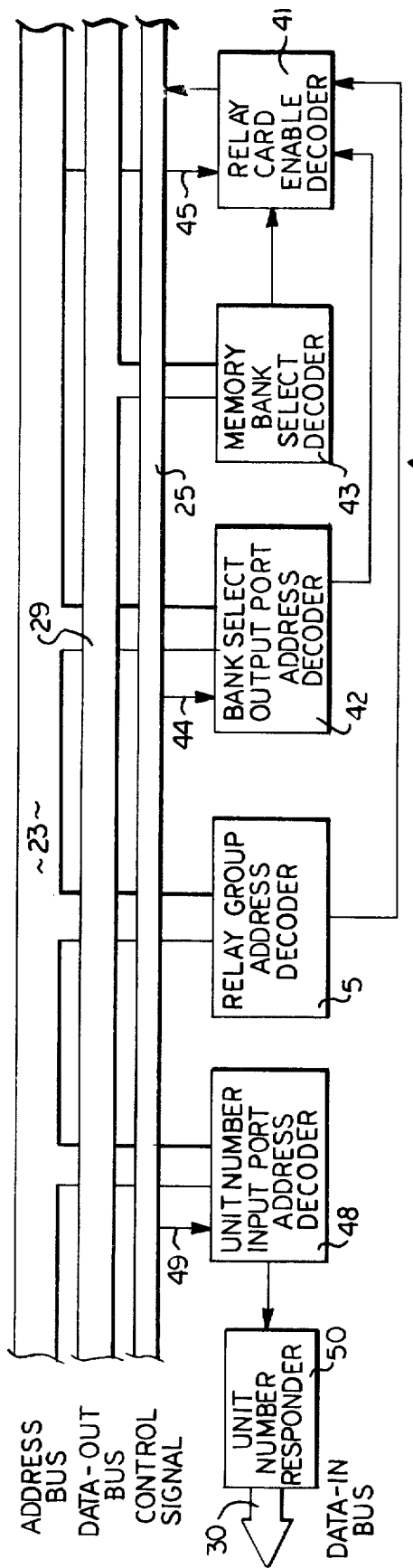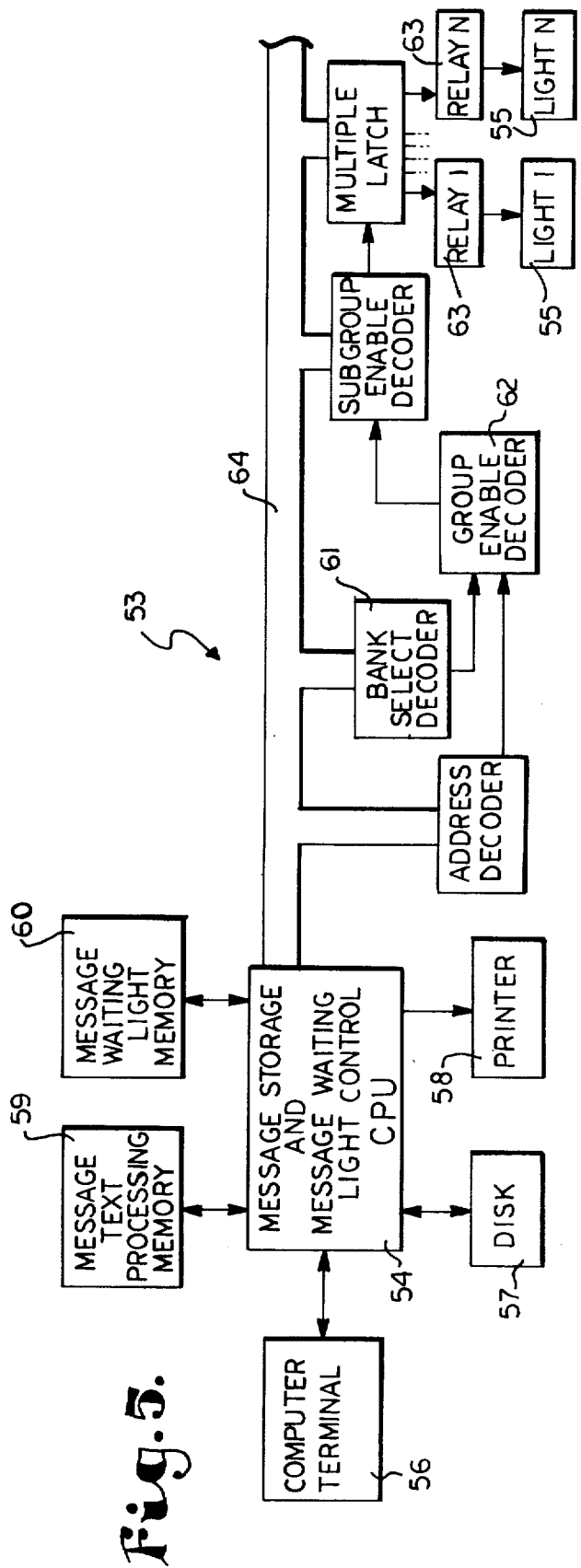

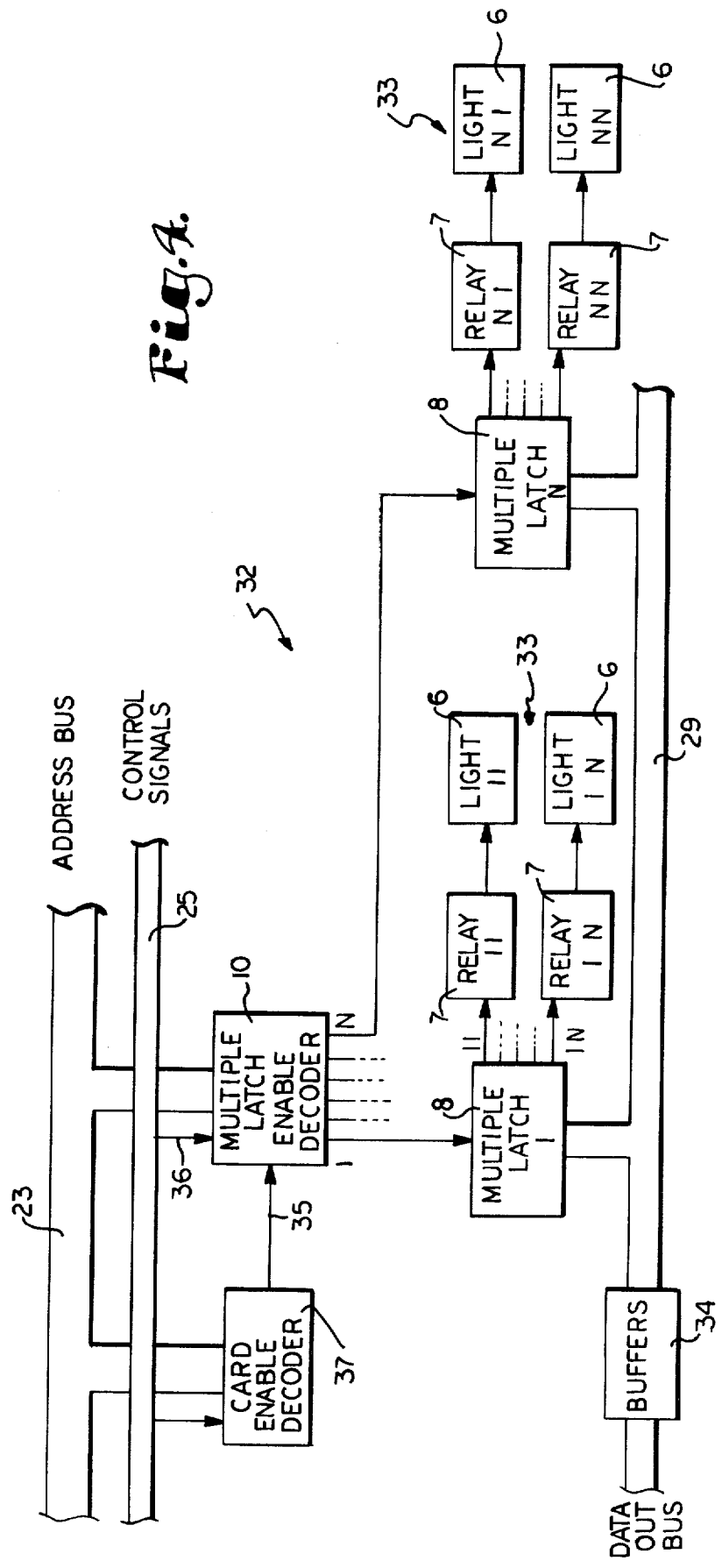

MESSAGE WAITING LIGHT CONTROL SYSTEM

FIELD OF THE INVENTION

The present invention relates to message waiting indicator systems and, more particularly, to such a system wherein message waiting lights are controlled by a microprocessor which is responsive to the storage and deletion of message texts in a message storage computer.

BACKGROUND OF THE INVENTION

Various arrangements have been devised for handling transcribed messages originating from a central station in complexes such as hotels, hospitals, large offices, answering services, and the like. Heretofore, uncompletable calls were routed to an operator who transcribed a message for the unavailable party. The operator then activated a message waiting light which was located at the called party's station. The light informed of the existence of a message, and the intended party could subsequently have the message read over a telephone or retrieve the hard copy of the message.

Transcribed message handling can be greatly facilitated by employing a computer system into which the texts of the message may be entered for storage and which is connected to dispersed terminals on which the message texts can be recalled and displayed.

SUMMARY OF THE INVENTION

The present invention provides a system for controlling the operation of message waiting lights in response to the storage and deletion of message texts in a message storage computer. The messsage waiting light control system according to the present invention generally includes: an organization of subgroups and groups or circuit cards of controlled latching switches or relays, each relay controlling a message waiting light; a memory storing a representation of each relay in a subgroup of relays as bits in memory word; an address decoder for each card of relays which activates the card and subgroup of relays in response to an address; and a microcomputer programmed to respond to the storage and deletion of message texts and an identification code number to change the memory bit corresponding to the code number, to address the card and subgroup of relays including the desired relay, and to write the memory word having the corresponding bit therein to the proper subgroup to thereby change the state of activation of the message waiting light of the person to whom the message is directed.

A modification of the invention contemplates the use of the microcomputer which controls the message waiting lights to additionally control the storage and retrieval of the message texts, or other functions. For this the microcomputer may be provided with a separate bank of memory to process such other functions; and the present invention provides for the selection of the desired bank of memory and for changing the state of activation of groups of lights only when the correct bank of memory has been selected.

OBJECTS OF THE INVENTION

The principal objects of the present invention are: to provide a system for informing personnel that messages are waiting for them; to reduce the need for the generation and storage or delivery of hard copy messages; to provide a message handling system including computer control of message waiting lights; to provide such a computer wherein entry of a message waiting command along with an identification number corresponding to a selected message waiting light effects activation of the light and entry of a message delete command along with the code number effects deactivation of the light; to provide such a computer wherein the lights are controlled by latches which are organized in subgroups corresponding to words of bits in a memory and wherein the subgroups are organized into addressable groups; to provide such a computer wherein group address decoders respond to selected address words to enable a selected group and a selected subgroup of latches and wherein a data word is written to a subgroup to change the state of selected latches thereof; to provide such a computer which is modular and expandable to control a diversity of numbers of message waiting lights; to provide such a computer which is capable of cooperation with many types of computers capable of storing the texts of message; to provide such a computer which is capable of other functions besides controlling the message waiting lights; and to provide such a message waiting light computer system which is economical to manufacture, convenient and reliable in operation, and which is particularly well adapted for its intended purpose.

Other objects and advantages of the present invention will become apparent from the following description taken in connection with the accompanying drawings wherein are set forth, by way of illustration and example, certain embodiments of the present invention.

The drawings constitute a part of the specification, include an exemplary embodiment of the present invention, and illustrate various objects and features thereof.

BRIEF DESCRIPTION OF THE DRAWINGS

FIG. 1 is a block diagram illustrating a message handling system including the message waiting light control system embodying the present invention.

FIG. 2 is a block diagram illustrating the microprocessor of the system of the present invention and the portions of the buses providing interface thereto.

FIG. 3 is a block diagram illustrating a relay card address decoder and a memory bank selector of the system.

FIG. 4 is a block diagram illustrating a group of multiple latches and relay/light sets and a board enabler and latch group decoder controller the latches.

FIG. 5 is a block diagram illustrating an alternate embodiment of the present invention wherein the microprocessor which controls the message waiting lights additionally controls the storage, retrieval, and deletion of the message texts.

DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring to the drawings in more detail:

The reference numeral 1 generally designates a message storage and retrieval computer with which the message waiting light control system 2 is interfaced. The system 2 generally includes a central processing unit (CPU) 3, a memory 4, an address decoder means 5, a plurality of groups of message waiting lights 6, respective relays 7 controlling the lights 6, a plurality of multiple latches 8 each multiple latch controlling a subgroup of relays 7 and lights 6, group enable means 9, and subgroup enable means 10.

The memory 4 is mapped as words having a number of bits therein equal to the number of relay/light sets in a subgroup, with each bit corresponding to an individual light 6. Each address decoder means 5 is set to enable the group and one of the subgroups associated therewith in response to an address word written by the CPU 3. Upon enabling a selected multiple latch 8, the memory mapped input/output word associated therewith is written thereto in order to change the state of activation of one of the lights 6 controlled thereby.

The correct address word, memory word, and bit in the memory word to control a given light 6 are determined from an identification number corresponding to the desired light 6. The desired state change of the light 6 is determined from a message waiting command or message delete command. Such commands are entered along with the identification code respectively when storing or retrieving the text of a message.

The message storage computer 1 normally would include a central message terminal 14 installed adjacent a PBX console (not shown) for entry of message texts in response to unanswered calls to extensions controlled by the PBX. The message waiting lights 6 are often provided on extension telephones (not shown), as in the offices of personnel. When a message waiting light 6 is activated, the occupant of the office is advised of the existence of a message for same. The occupant may then go to a convenient terminal 15, remote from the central terminal 14, and call up and display the message by a command which includes the code number corresponding to his message waiting light 6. The terminal 15 may include a printer 16 for making a hard copy of the message. Upon deletion of the message by a delete command, the message waiting light 6 corresponding to the code number by which the message was retrieved is deactivated.

Referring to FIG. 2, the CPU 3 includes a microprocessor 18 which may be programmed by means such as a read only memory (ROM) 19 which may be an EPROM. In the illustrated embodiment, the CPU 3 communicates with the message storage computer 1 by means of a serial bus 20 and a serial interface 21. Preferably, the serial bus 20 is a standard type of bus, such as an RS-232 serial bus. It is preferred that the serial interface 21 include a universal asynchronous receive-transmit interface (UART) (not shown) having a software controllable timer for controlling the rate of data transmission therethrough. In the preferred embodiment, the CPU 3 communicates with the computer 1 using standard coded characters, such as ASCII characters, to render the system 2 compatible with a wide variety of computers 1.

The bus system for the message waiting light control system 2 is preferably a standard type of parallel bus, such as an S-100 bus, the lines of which may be divided into an address bus 23, a data bus 24, and a control signal bus 25. The address bus 23, data bus 24, and control bus 25 include respective drivers 26, 27 and 28 therefor.

Past the data bus drivers 27, the data bus 24 may be further divided as a data-out bus 29 and a data-in bus 30.

Referring to FIG. 4, the relays 7, which equivalently could be solid state controlled switches such as transistors, are preferably reed relays for D.C. isolation of the lights 6 from the control system 2. The relays 7 are organized as groups thereof, a group being the number of relays 7 which can fit on a circuit card of a given size along with circuitry needed to control the relays 7. FIG. 4 is a representation of such a group, or relay card, 32. On the relay card 32, the relays 7 are further subdivided into subgroups 33, the number of relays in which is equal to the number of bits in a word in the memory 4. As an example, forty-eight relays 7 can be provided on a card 32 in six subgroups 33 of eight relays 7.

The relays 7 in a subgroup 33 are controlled by latches which may be enabled simultaneously. The multiple latches 8 may be implemented as any combination of individual or multiple latches all having their enable inputs tied together to the subgroup enable means 10. A latch when enabled is operative to take on a change of state and hold same if the input condition is different from the existing condition, or maintin an existing state if the input condition is the same. The inputs of the individual latches of a multiple latch 8 are connected to the individual lines of the data-out bus 29 and are responsive to the bit conditions of a data word written thereon if the multiple latch 8 is enabled. Each relay card 32 preferably includes buffers 34 included in the lines of the data-out bus 29.

The multiple latches 8 are enabled by the subgroup or multiple latch enable decoder 10. The decoder 10 is connected to the address bus 23 and is responsive to certain bits of a selected address word to enable the desired multiple latch 8. The decoder 10 also requires a certain condition of a card enable signal received on line 35 and of a control signal from the CPU 3 received on line 36 in order to enable the desired multiple latch 8. The card enable signal is decoded from certain bits in the selected address word by the card enable decoder 37.

The card enable decoder 37 is preferably defined by a combination (not shown) of logic gates, preset logic conditions, and switched logic conditions which are arranged to recognize, that is, respond to or decode a word written on the address bus 23 by providing a needed logic condition. The multiple latch decoder 10, on the other hand, is a means such as a 3to-8 line decoder wherein, for example, six output lines are used to provide the enable signal to six multiple latches 8 and wherein three lines of the address bus 23 are connected to the three input lines thereof.

Referring to FIG. 3, the relay group address decoder 5 and associated circuitry are represented. The functions represented by the blocks in FIG. 3 may be provided for on a circuit card separate from but associated with the relay card 32, and may be implemented as a relay controller card 40. There may be a plurality of relay cards 32 in the light control system 2, each card 32 controlled by a relay controller card 40. The relay controller card 40 functions to provide a group or relay card enable signal through a second relay card enable decoder 41 on the card 40 through the control signal bus 25 to the card enable decoder 37 on the relay card 32. The decoder 41 preferably includes a flip-flop and other logic circuitry (not shown) which provide a selected output condition in response to a combination of input conditions.

The relay group address decoder 5 is connected to the address bus 23 and is responsive to a portion of an address word thereon to provide one of the conditions required by the relay card enable decoder 41 to generate a signal to enable the relay card 32. The decoder 41 may require that other conditions be met before the relay card enable signal is provided thereby.

It is contemplated that the CPU will be employed to process other functions besides control of the message waiting lights 6. In order to process such other functions, the CPU 3 would preferably be provided with other memories besides the memory 4. The words in such other memories might have the same addresses as the words in the memory 4. Therefore, a means is required to render the relay controller card 40 responsive to address and data words only when the memory 4 has been selected by the CPU 3. In order to provide the relay controller card 40 with a means for responding to the selection of a memory bank, the relay controller card 40 is provided with a bank select output port address decoder 42 and a memory bank select decoder 43 which cooperate to provide the relay card enable decoder 41 with another of the conditions required to generate the relay card enable signal. The output port address decoder 42 is connected to the address bus 23 and receives a control signal on line 44 from the CPU 3. The decoder 42 provides an enabling condition to the relay enable decoder 41 in response to a selected output port address provided by the CPU 3 during selection of a memory bank. The memory bank select decoder 43 is connected to the data-out bus 29 and provides an enabling signal to the relay card enable decoder 41 in response to a selected data word written by the CPU 3 only when selecting the memory 4. The relay card enable decoder 41 may also require a signal from at least one of the lines 45 of the address bus 23 in order to develop the relay card enable signal. When the CPU 3 is operated with the memory 4 only, the conditions provided by the decoders 42 and 43 may be provided by presetting the conditions for the decoder 41.

In the preferred embodiment of the control system 2, means are provided to allow the CPU 3 to respond only to valid commands received from the message storage computer 1. When communication is established between the message storage computer 1 and the CPU 3, the message storage computer 1 sends a unit number to the CPU 3 corresponding to the particular relay controller card 40. The relay controller card 40 is provided with the means for recognizing the unit number, as translated by the CPU 3, and for responding thereto. For this purpose, the relay controller card 40 is provided with a unit number input port address decoder 48 connected to the address bus 23. The CPU 3 converts the unit number received from the message storage computer 1 to an address word which is written on the address bus 23. If the unit number decoder 48 recognizes the address word, and receives a control signal on line 49, the decoder 48 controls a unit number responder 50 to send the same address word which represents the unit number back to the CPU 3 on the data-in bus 30 so that the CPU 3 may respond to the message storage computer 1 that a valid unit number has been sent.

Each of the decoders 5, 42, 43, and 48 is constructed as an arrangement of logic gates, preset logic conditions, and switched logic conditions in the same manner as the card enable decoder 37 and multiple latch enable decoder 10 of the relay card 32. All of the decoders mentioned are set such that they are responsive only to either a single selected address or data word or a range of same. It is believed that the actual circuit details of said decoders would occur to one skilled in logic circuit design given the required conditions; and such details are, therefore, omitted herefrom.

When it is desired to activate a message waiting light 6 corresponding to the person for whom a message is to be stored, a command string, preferably consisting of ASCII coded characters, is entered into the central message terminal 14 for communication to the message waiting light control CPU 3 by way of the message storage computer 1. The typical command string might consist of four parts requiring two entries two at a time with responses to the computer 1 from the CPU 3. The first part of the command string would consist of a synchronization character, such as "$", and a unit number corresponding to the relay controller card 40 which controls the relay card 32 on which the relay 7 controlling the desired message waiting light 6 is located. The synchronization character causes the CPU 3 to synchronize with the computer 1 in order to allow further communication therebetween. The unit number is translated by the CPU 3 into an address word which is written on the address bus 23. If the sent unit number is valid, the unit number input port address decoder 48 of the corresponding relay controller card recognizes the address word, and controls the associated unit number responder 50 to return the address word to the CPU 3 on the data-in bus 30. The CPU 3 then sends a unit number matched response which may be a symbol such as "#". The third and fourth parts of the command string include the number associated with the desired message waiting light 6, that is, the identification code number and a message waiting or ON command. The ON command may be, for example, a numeral 1. The light number or code number is converted by the CPU 3 into an address word in order to enable the relay group address decoder 5, the card enable decoder 37, and the multiple latch enable decoder 10. The code number is further operated on arithmetically by the CPU 3 in order to locate the memory mapped I/O word in the memory 4 corresponding to the subgroup of message waiting lights 6 including the desired light. The CPU 3 is then operative to change the bit in the memory word corresponding to the desired message waiting light 6, and the word is written on the data-out bus 29 and is addressed to the correct multiple latch 8 which, having been enabled, allows the data word having a bit therein changed to change the state of the relay 7 associated with the desired light 6 and to hold same in an ON condition until subsequently changed.

When the person to whom the message was directed returns and notices that his message waiting light 6 is activated, he may go to a conveniently located remote message terminal 15 to call up a message or messages by entry of a suitable message retreival command including his code number therein. The message, having been received, may be deleted from the computer 1 by entry of a suitable message delete command including a command string similar to the message waiting command. In the message delete command instead of an ON command, which is a numeral 1, an OFF command such as a numeral 0, for example, may be entered in order to effect deactivation of the corresponding message waiting light 6. After either a message waiting or message delete command string has been sent to the CPU 3, the CPU executes the command, if possible and responds with a command executed response such as a "#"; or if the command was not executable, the CPU responds with an error response such as a "%".

FIG. 5 illustrates a modified embodiment 53 of the present invention wherein a central processing unit 54 is employed both in the processing of data for the storage and retrieval of the texts of the messages and for the control of a plurality of message waiting lights 55. The system 53 includes at least one computer terminal 56 for the entry of the message texts and for the recall and display of same. The system 53 may include magnetic disks 57 for storage of the texts and may include a printer 58 for the generation of hard copies of the messages as needed. In the system 53, separate memories are provided for the processing of message storage and message waiting light control functions. A message text processing memory 59 is selected by the CPU 54 when processing the texts of the messages. Similarly, a message waiting light memory 60 is selected by the CPU 54 when message waiting light control functions are being processed. The remainder of the system 53 is substantially similar to the light control system 2 except that in the system 53, bank selection means 61 must be employed so that the group enable decoder 62 for each group of relays 63 will be enabled only when the CPU 54 selects the memory 60. When the CPU selects the message text processing memory 59, the bank select decoder 61 is not responsive and does not enable the group enable decoder 62, whereby address and data words written on the bus system 64 of the system 53 are not acted upon erroneously by the message waiting light control portions of the system 53.

While certain forms of the present invention have been described and illustrated, it is not to be limited thereto except insofar as such limitations are included in the following claims.

What is claimed and desired to secure by Letters Patent is:

1. A message waiting light control system for activating and deactivating message waiting lights in response to the storage and deletion of texts of messages in a message storage computer, said system comprising:
   (a) a plurality of message waiting lights positioned respectively at a plurality of stations, each light upon being activated indicating the existence of a message for an occupant of the station at which said light is positioned, each light being associated with a unique identification code;
   (b) a message waiting light control computer operatively connected to said lights and controlling the activation and deactivation of said lights, said light control computer including memory means;
   (c) interface means connecting said light control computer to a message storage computer including message entry means, message display means, and a message memory for the storage of the texts of messages therein; and
   (d) said light control computer being programmed to effect:
      (1) the activation of a message waiting light in response to the entry of the text of a message into said entry means and the entry and execution by the message computer of a message waiting command including the identification code corresponding to said light; and
      (2) the deactivation of said light in response to the entry into said entry means and the execution by said message computer of a message delete command including said identification code corresponding to said light.

2. A system as set forth in claim 1 including:
   (a) an address bus and a data bus connected to said light control computer;
   (b) said message waiting lights being arranged in subgroups;
   (c) each subgroup of lights being operatively connected to said data bus by a subgroup latch means having a latch circuit for each light in said subgroup, the latch circuits of said latch means being enabled simultaneously and upon being enabled allowing changes of the logic states thereof in response to the bit patterns of data words written on said data bus upon the execution of said message waiting and delete commands; and
   (d) subgroup enables means connected to said address bus and said subgroup latch means and simultaneously enabling the latch circuits thereof in response to a corresponding preselected address word written on said address bus upon the execution of said message waiting and delete commands.

3. A system as set forth in claim 2 including:
   (a) said subgroups being arranged in groups;
   (b) each subgroup enable means requiring a group enable signal in order to respond to said corresponding preselected address word; and
   (c) group enable means operatively connected to said address bus and to each subgroup enable means of a group and providing said group enable signal to each subgroup enable means in response to a corresponding group enable address word written on said address bus upon the execution of said message waiting and delete commands.

4. A system as set forth in claim 1 including:
   (a) a light control memory comprising a portion of said memory means of said light control computer, said light control computer storing information indicative of the state of activation of each of said message waiting lights in said light control memory.

5. A system as set forth in claim 4 including:
   (a) a data bus connected to said light control computer, said data bus including a preselected number of data lines;
   (b) said message waiting lights being organized as subgroups, each subgroup incuding a number of said lights equal to said preselected number; and
   (c) said light control memory being organized as data words, each word having a number of bits equal to said preselected number, each data word corresponding to a single subgroup of said lights, and each bit of a data word corresponding to and storing a logic level indicating the state of activation of a light in the subgroup corresponding to said data word.

6. A system as set forth in claim 5 including:
   (a) an address bus connected to said light control computer;
   (b) each subgroup of lights being operatively connected to said data bus by a latch means including a latch circuit for each light in said subgroup, the latch circuits of said latch means being enabled simultaneously and upon being enabled assuming a state of activation determined by the bits in a data word written on said data bus;
   (c) each subgroup having a subgroup enable means connected to said address bus and to the latch means thereof, said subgroup enable means enabling said latch means in response to a preselected address word corresponding to said subgroup; and (d) said light control computer changing the state of activation of a selected light corresponding to a single identification code by recalling the data word corresponding the subgroup of said selected light, changing the logic level of the bit in said data word corresponding to said light, storing the changed data word in said light control memory, and writing said changed data word on said data bus in timed relationship to writing on said preselected address bus the preselected address word corresponding to the subgroup of said selected light.

7. A system as set forth in claim 4 including:
(a) an address bus and a data bus connected to said light control computer;
(b) said message waiting lights being organized as groups of said lights;
(c) group enable means connected to said address bus and operatively connected to said lights in a group thereof, said group enable means allowing changes of the state of activation of the lights in the group associated therewith upon a preselected address word being written on said address bus and upon itself being enabled;
(d) said light control memory including more than one memory bank, corresponding words in each of the banks having the same address, said light control computer being operative to activate a single bank at a time for access thereto;
(e) each group of lights being associated with a single memory bank; and
(f) bank select decoder means connected to said address bus, said data bus, and the group enable means of a group and operative to enable said group enable means upon the selection by said light control computer of the memory bank associated with said group in response to a corresponding bank select address word written on said address bus and a bank select data word written on said data bus by said light control computer.

8. A message storage and retrieval system comprising:
(a) a plurality of message waiting lights positioned respectively at a plurality of stations, each light upon being activated indicating the existence of a message for an occupant of the station at which said light is positioned, each light being associated with a unique identification code;
(b) a computer terminal including message entry means for the entry of the texts of messages and message display means for the display of texts of messages;
(c) memory means for storing texts of messages;
(d) computer means having said terminal, said memory means, and said message waiting lights interfaced therewith; and
(e) said computer means being programmed to effect:
(1) the storage of the text of a message in said memory means in response to the entry of a message waiting command including the identification code corresponding to the message waiting light at the station to which said message is directed, and the execution of said message waiting command by said computer means;
(2) the activation of the message waiting light corresponding to said identification code upon the execution of said message waiting command;
(3) the display of said text on said message display means in response to the entry into said terminal and the execution by said computer means of a message retrieval command including said identification code;
(4) the deletion of said text from said memory means in response to the entry into said terminal and the execution by said computer means of a message delete command including said identification code; and
(5) the deactivation of the message waiting light corresponding to said identification code upon the execution of said message delete command.

9. A system as set forth in claim 8 wherein said computer means includes:
(a) a message storage computer for controlling the storage, display, and deletion of the texts of messages; and
(b) a message waiting light control computer for controlling the state of activation of each of said message waiting lights.

10. A method for controlling a plurality of message waiting lights comprising the steps of:
(a) positioning a plurality of message waiting lights respectively at a plurality of dispersed stations, each light upon being activated indicating the existence of a message for an occupant of the station at which said light is positioned;
(b) associating each message waiting light with a corresponding identification code;
(c) entering the text of a message into a computer terminal having a message entry means and a message display means;
(d) storing said text in a memory of a computer having said terminal connected thereto by the entry into said terminal of a message waiting command including the identification code corresponding to the message waiting light of the station to which said message is directed and by the execution of said message waiting command by said computer;
(e) activating the message waiting light corresponding to said identification code upon the execution of said message waiting command;
(f) displaying said text on said display means by the entry into said terminal of a message display command including said identification code and by the execution of said message retrieval command by said computer;
(g) deleting said text from said memory by the entry into said terminal of a message delete command including said identification code and by the execution of said message delete command by said computer; and
(h) deactivating said message waiting light corresponding to said identification code upon the execution of said message delete command.

* * * * *